United States Patent
Takahashi

(10) Patent No.: US 6,633,592 B1
(45) Date of Patent: Oct. 14, 2003

(54) DATA MULTIPLEXING METHOD, METHOD AND DEVICE FOR REPRODUCING MULTIPLEXED DATA, AND RECORDING MEDIUM CONTAINING THE DATA MULTIPLEXED BY SAID METHOD

(75) Inventor: Toshiya Takahashi, Ibaraki (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/180,420

(22) PCT Filed: Apr. 28, 1997

(86) PCT No.: PCT/JP97/01484

§ 371 (c)(1),
(2), (4) Date: Dec. 28, 1998

(87) PCT Pub. No.: WO97/44955

PCT Pub. Date: Nov. 27, 1997

(30) Foreign Application Priority Data

May 17, 1996 (JP) .............................................. 8-148108

(51) Int. Cl.$^7$ ................................................ H04J 3/02
(52) U.S. Cl. ...................................................... 370/537
(58) Field of Search ................................. 370/530–538, 370/486, 378, 428, 522, 323, 325; 348/584–589, 21, 614, 554–558, 564, 565, 467–468; 345/546–554, 563, 568, 423, 427, 629; 725/82–93, 100, 129–131, 240.14; 342/25, 191; 346/611; 375/222, 326, 327, 323, 325, 211, 240.23

(56) References Cited

U.S. PATENT DOCUMENTS

| | | | | |
|---|---|---|---|---|
| 4,463,372 A | * | 7/1984 | Bennett et al. | 348/580 |
| 4,835,532 A | * | 5/1989 | Fant | 346/611 |
| 4,970,666 A | * | 11/1990 | Welsh et al. | 345/423 |
| 5,270,859 A | * | 12/1993 | Wirth et al. | 359/622 |

(List continued on next page.)

FOREIGN PATENT DOCUMENTS

| | | |
|---|---|---|
| DE | 41 38 517 A1 | 5/1993 |
| JP | 6-139325 | 5/1994 |
| JP | 6-284297 | 10/1994 |
| JP | 6-327010 | 11/1994 |
| JP | 7-220091 | 8/1995 |

OTHER PUBLICATIONS

"Object–Oriented Television"; V.M. Bove; SMPTE Journal; vol. 104, No. 12; Dec. 1, 1995, pp. 803–807; XP000543848 *the whole document*.

"A Layered Coding System for Very Low Bit Rate Video Coding"; H.G. Musmann; Signal Processing, Image Communication; vol. 7, No. 4–06; Nov. 1, 1995; pp. 267–278; XP000538013.

(List continued on next page.)

Primary Examiner—Kwang Bin Yao
Assistant Examiner—Prenell Jones
(74) Attorney, Agent, or Firm—Parkhurst & Wendel, L.L.P.

(57) ABSTRACT

A picture is treated as an aggregate of plural objects, and the picture data is processed on an object-oriented basis to be multiplexed. A method of multiplexing data comprises the steps of (1) dividing the picture into a plurality of master objects, and identifying themselves as the master objects; (2) dividing the identified master object into smaller slave objects upon request, and identifying themselves as the slave objects, whereby a hierarchy is formed; (3) packetizing one of the identified master object and the identified slave object into a packet, and assigning a packet number to the packet, and (4) adding the hierarchical details as hierarchical information to the multiplexed data. In addition to this method of multiplexing data, a reproducing method of data multiplexed through this method of multiplexing data, and a, data reproducing apparatus using the reproducing method are provided by the present invention.

27 Claims, 18 Drawing Sheets

U.S. PATENT DOCUMENTS

| | | | | | |
|---|---|---|---|---|---|
| 5,321,514 | A | * | 6/1994 | Martinez | 375/62 |
| 5,335,323 | A | * | 8/1994 | Kolnick | 345/765 |
| 5,394,520 | A | * | 2/1995 | Hall | 345/632 |
| 5,715,009 | A | * | 2/1998 | Tahara et al. | 375/240.23 |
| 5,751,707 | A | * | 5/1998 | Voit et al. | 370/384 |
| 5,818,512 | A | * | 10/1998 | Fuller | 725/82 |
| 5,883,661 | A | * | 3/1999 | Hoarty | 725/93 |
| 6,192,073 | B1 | * | 2/2001 | Reader et al. | 375/240.23 |
| 6,310,655 | B1 | * | 10/2001 | Godwin | 348/564 |

OTHER PUBLICATIONS

By Etoh et al., "Current Status of an Emerging Coding Standard, MPEG–4," 1996, pp. 55–60.

By Miki et al., "MPEG4 Standardisation Activities," 1996, pp. 43–48.

By Kobayashi et al., "International Standardization of Multimedia Multiplexing/Demultiplexing," 1994, pp. 37–42.

* cited by examiner

FIG. 3A

| object 1 TS packet PID=k | object 2 TS packet PID=m | object 3 TS packet PID=n | object 1 TS packet PID=k | object 2 TS packet PID=m | - - - - - | object 1 TS packet PID=k |
|---|---|---|---|---|---|---|

FIG. 3B

| header layer id=a | picture data | header layer id=b | picture data | header | audio data | - - - |
|---|---|---|---|---|---|---|

FIG. 3C

| table No. = 2 | - - - | Program No. | - - - | object 1 PID | object 2 PID | object 3 PID | - - - |
|---|---|---|---|---|---|---|---|

FIG. 7A

| TS packet PID=k | TS packet PID=m | TS packet PID=k | TS packet PID=m | TS packet PID=n | - - - - | TS packet PID=k |
|---|---|---|---|---|---|---|

FIG. 7B

| TS packet PID=k SubPID=sa | TS packet PID=k SubPID=sb | TS packet PID=k SubPID=sc | TS packet PID=k SubPID=sa | TS packet PID=k SubPID=sb | - - - - - | TS packet PID=k SubPID=sc |
|---|---|---|---|---|---|---|

FIG. 7C

| Table No=0 | - - - | Program No. | Program map PID | Program No. | Program map PID | - - - |
|---|---|---|---|---|---|---|

FIG. 7D

| Table No=2 | - - - | Program No. | - - - | Picture PES PID | Audio PES PID | Data PES PID | Object 1 program map PID | - - - |
|---|---|---|---|---|---|---|---|---|

FIG. 7E

| - - - | Object No. | - - - | Picture PES Sub PID | Audio PES Sub PID | Data PES Sub PID | Object 11 program map Sub PID | - - - |
|---|---|---|---|---|---|---|---|

| Strem "id" | Index | Parent index | Child idex | Packet "id" | Parent packet "id" | Child packet "id" |
|---|---|---|---|---|---|---|
| 1 | 1 | | | 1 | | |
| 2 | 1 | | 2,3,4,5 | 2 | | 2,4 |
| 3 | 1 | | | 3 | | |
| 4 | 2 | 1 | | 2 | 2 | |
| 5 | 3 | 1 | | 2 | 2 | |
| 6 | 4 | 1 | | 2 | 2 | |
| 7 | 5 | 1 | | 4 | 2 | |

DATA MULTIPLEXING METHOD, METHOD AND DEVICE FOR REPRODUCING MULTIPLEXED DATA, AND RECORDING MEDIUM CONTAINING THE DATA MULTIPLEXED BY SAID METHOD

TECHNICAL FIELD

The present invention relates to a method of multiplexing data for multiplexing and transmitting data such as digital pictures, audio, digital data and the like, a method of decoding for reproducing the multiplexed data, and a device for practicing these methods. More particularly, the present invention relates to a method of multiplexing data, which processes picture data by each object, i.e., a picture is an aggregate of plurality of objects, a method of reproducing the multiplexed data, and a device for practicing these methods. These methods and the device contributes to reduce data quantity and increase an efficiency of data processing.

PRIOR ART

Recently, digital pictures and audio service are commercially used in broadcasts, CATVs and the like thanks to advancement of compression technique. Regarding the transmission of digital pictures, audio and the like, not only the compression technique but also a method of multiplexing data must be seriously discussed.

The international standard method of multiplexing data, i.e., MPEG 2 (ISO/IEC JTC1/SC29 N801, ISO/IEC CD 13818-1: Information technology-Generic coding of moving pictures and associated audio: Systems, 1994.11) is described hereinafter highlighting the multiplexing data method, and the multiplexed data reproducing apparatus with reference to the attached Figures.

FIGS. 20 and 21 depict a conventional method of multiplexing data of MPEG 2 standard. FIG. 22 is a block diagram depicting a multiplexed-data reproducing apparatus that decodes the multiplexed-data through the multiplexing method of MPEG 2 standard. In FIG. 22, a separator 161 comprises a buffer 1611 and a CPU 1612. A synchronizing controller 162, a picture decoder 163 and an audio decoder 164 are the elements of the reproducing apparatus. FIG. 23 is a flowchart depicting an operation of the CPU 1612 of the separator 161.

An operation of the conventional method of multiplexing data and the multiplexed-data reproducing apparatus according to MPEG 2 standard is hereinafter described.

Picture data and audio data are compressed into PES packet, namely, in the case of picture data, each "frame" that is a certain number of samples is compressed, then one frame or a plural frames bundled forms a packet called as "PES packet." In the case of audio data, a certain number of samples (in MPEG standard, the sample of audio data is also called "frame"), for instance, "1024" is compressed and then forms a PES packet same as the case of picture data.

FIG. 21 outlines a format of the PES packet. The PES packet is headed by a header, which includes the following information:

Stream ID: identify whether the data area following the header contains picture data, audio data or other data;
Time information for synchronized reproduction pictures with audio data and the resultant data;
DTS (decoding time stamp, decode time information);
PTS (presentation time stamp, presentation time information). The PES packet is divided into a plural TS packets (each TS packet comprises 188 bytes) before being transmitted.

FIG. 20 outlines a format of the TS packet. The TS packet is headed by PID (packet identification) that is a proper number (packet No.) of each PES packet. The same PES packet has the same PID. The TS packet sends a header followed by data as shown in FIG. 20(b). The PID of TS packet is sent as a part of the header as shown in FIG. 20(c).

In the data area of TS packet, PSI (program specific information) can be sent in addition to PES packet as shown in FIG. 20. PSI includes information about selecting a program. FIG. 20(d) depicts a structure of program association table (PAT), which is one of PSI, and FIG. 20(e) depicts a structure of program map table (PMT).

The PAT is assigned PID=0, where a PID of PMT that contains program No. and its content is described. Respective PIDs of a program No. indicating a program No. to be transmitted, picture data PES packet, audio data PES packet and data PES packet are included in PMT. This PMT is multiplexed and transmitted.

FIG. 22 depicts an example of a conventional multiplexed-data reproducing apparatus which receives and reproduces the data multiplexed through the above method.

The multiplexed data received by the conventional apparatus is firstly stored in the buffer 1611. The CPU 1612 operates following the flowchart shown in FIG. 23. First, search a PAT of PID=0 in the transmitted data (step 171.) Then, out of the PAT, search a PID of PMT of a desired program No. set from outside (step 172.) Next, pick out a packet having the PMT's PID obtained from the PAT out of the multiplexed data (step 173.)

After this pick-out, PIDs of picture data PES, audio data PES and data PES packet are stored (step 174.) Finally, pick out a necessary TS packet for reproducing the program by identifying a TS packet's PID out of the received data (steps 175 and 176).

PID is not described in PAT, and the table of PAT does not contain both of a program No. and PID of PES, but the tables of PAT and PMT are used because it is necessary to avoid a long size table when a multiple programs are multiplexed. This structure can deal with a partial change of a program with ease and flexible by altering a content of PMT.

The picture packet and audio packet out of TS packets are sent respectively to the decoders 163 and 164. The synchronizing controller 162 picks out time information such as multiplexed PTS, DTS and the like from PES packet, and controls a timing of synchronizing reproduction by the decoder. The decoders 163 and 164 reproduce pictures in step with synchronization with audio data, as well as display the resulted pictures.

The above structure, however, produces the following various problems. In picture encoding, independent object is coded, i.e., each component that constitutes a picture, e.g., a background, a person, and a moving body, is individually coded. This object coding method now draws attention. Since the object coding encodes individual body, an editing such as replacing or removing a specific body can be done with ease, also a specific item can be searched easily.

The conventional multiplexing method, however, handles only a concept of "frame", and thus it cannot handle a picture with a concept of "object". Another method to overcome this disadvantage can be discussed. That is to say, the prior art is extended, and a picture is taken to be a group of objects instead of a frame, and a PES packet is formed to an individual object. In other words, a method that assigns other PIDs to each object can be studied. However, when a large number of objects constituting a picture are required, this method must employ a complicated multiplexing apparatus that can deal with increased kinds of packets. Further, when an individual object is encoded, objects must be sometimes overlapped and displayed; however, the conventional method only has a synchronizing function using a time base, but cannot assign a display location in a picture to a receiver side.

DISCLOSURE OF THE INVENTION

The present invention addresses the above problems and aims to provide a method of multiplexing data and a multiplexed data reproducing apparatus that overcome the above problems.

A method of multiplexing data processes digital data on an individual object base, and has a technique to set a hierarchical structure in the object. More specifically, the method multiplexes digital data "p1" and "d1" into a first object data "o1". Further, make a digital data "p2" as a second object data "o2". The first and second object data "o1" and "o2" are treated as an individual object, and these two data are further multiplexed, whereby an upper class third object data "o3" is obtained. The data can be processed using either this third object data in the upper class or the first and second object data in the lower class.

Another structure is available, i.e., multiplex digital data "p1" and "d1" to produce the first object data "o1". This first object data "o1" is packetized into a first packet data "op1". The second digital data "d2" is made into the second object data "o2", which is packetized into a second packet data "op2". Then these packet data are further multiplexed to produce a third packet data "op3". A packet No. that identifies each packet is given to the packet data "op1" and "op2" respectively, whereby an individual object is assigned a packet No. Data can be thus processed with ease on individual object base. Further, the data can be processed as an upper class data that integrates the first and second objects into the third packet data "op3".

The present invention treats a picture as an aggregate of plural objects, and processes as well as multiplexes picture data on each object base into multiplexed data, where a method proposed by the present invention comprises the steps of:

(a) dividing a picture into plural master objects and identifying themselves as master objects;

(b) dividing the identified master object into further small slave objects and identifying themselves as slave objects, thereby dividing the master object into plural hierarchical classes;

(c) packetizing the identified master object and/or the slave object into a packet, and assigning a packet No. to each packet; and (d) adding the data of hierarchical classes as hierarchical information to the multiplexed data.

The present invention also provides a method of reproducing the data multiplexed through the above method, and a multiplexed data reproducing apparatus using the method thereof Since a packet number is assigned to respective objects, data can be processed on an individual object base with ease. Therefore, a target object can be easily picked out, reproduced, or edited. At the same time, data quantity can be reduced thanks to hierarchical division. A master object in an upper class and a slave object in a lower class can be separately processed upon request.

Further, time data of starting a reproduction and location data where the object is reproduced, are multiplexed in the data, whereby the object can be reproduced based on the time data and location data. As a result, processing efficiency can be improved.

BRIEF DESCRIPTION OF THE DRAWINGS

FIG. 3, is an explanatory chart depicting a structure of data multiplexed in the first exemplary embodiment of the present invention. FIG. 3($a$) shows a packet structure, and FIG. 3($b$) shows a PAT structure and FIG. 3($c$) shows a PMT structure.

FIG. 7 is an explanatory chart depicting data multiplexed in a second exemplary embodiment of the present invention. FIG. 7($a$) shows an output of a multiplexer, FIG. 7($b$) shows a packet structure collecting the same PID, FIG. 7($c$) shows a PAT structure, FIG. 7($d$) shows an example of a PMT structure and FIG. 7($e$) shows an example of PMT of a finer object.

FIG. 12($b$) details an error process section of this flowchart.

FIG. 15($a$) shows an output of an data multiplexer. FIG. 15($b$) shows a packet structure.

FIG. 20 is explanatory charts of a conventional method of multiplexing data according to MPEG 2 standard.

FIG. 21 depicts the conventional method of multiplexing data according to MPEG 2 standard.

DETAILED DESCRIPTION OF THE EXEMPLARY EMBODIMENTS

Exemplary Embodiment 1

A method of multiplexing data in the first exemplary embodiment is described hereinafter with reference to the attached drawings.

Figure 1:
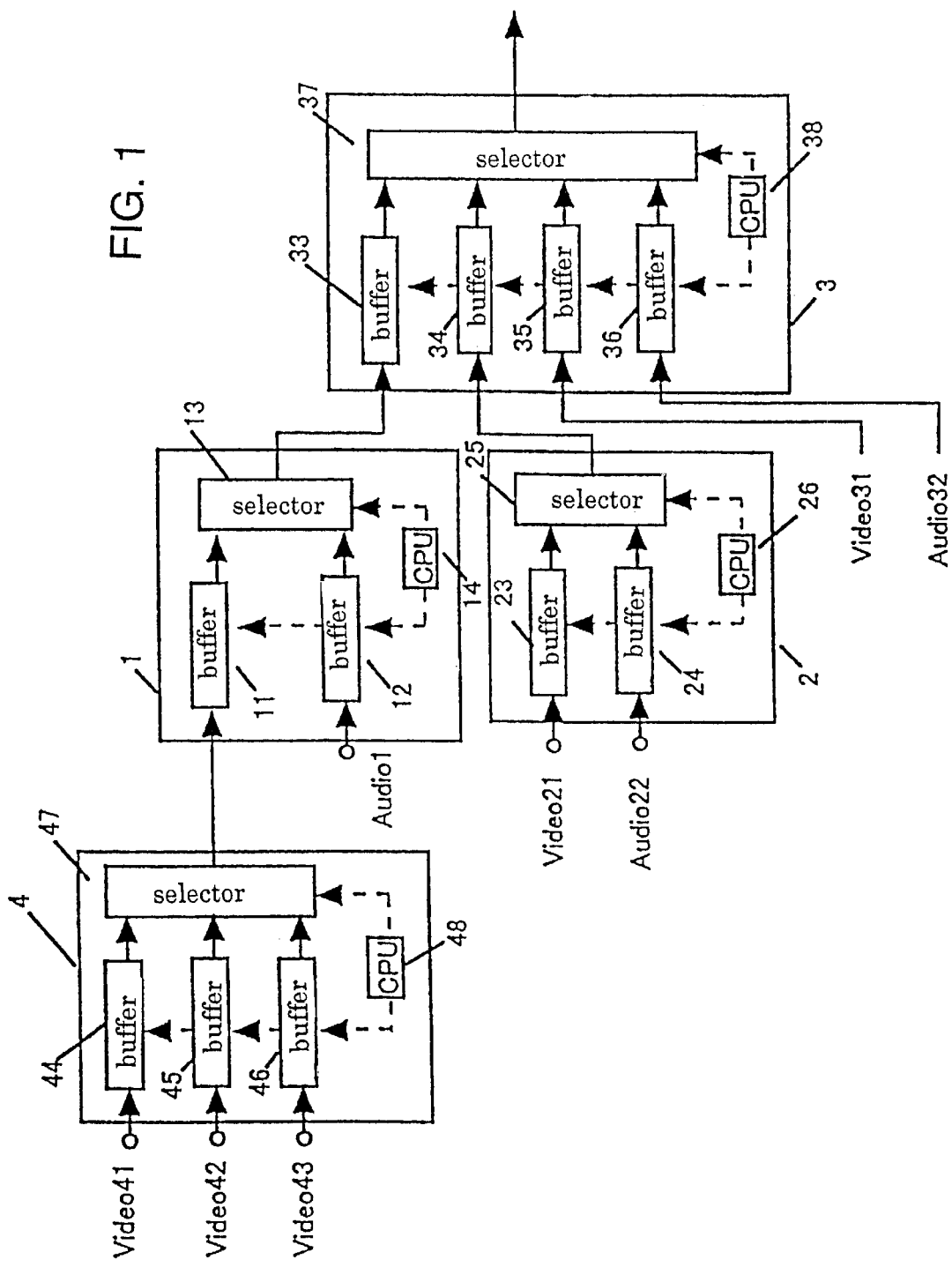
FIG. 1 is a block diagram of a data multiplexing apparatus used in a first exemplary embodiment of the present invention.
Figure 2:
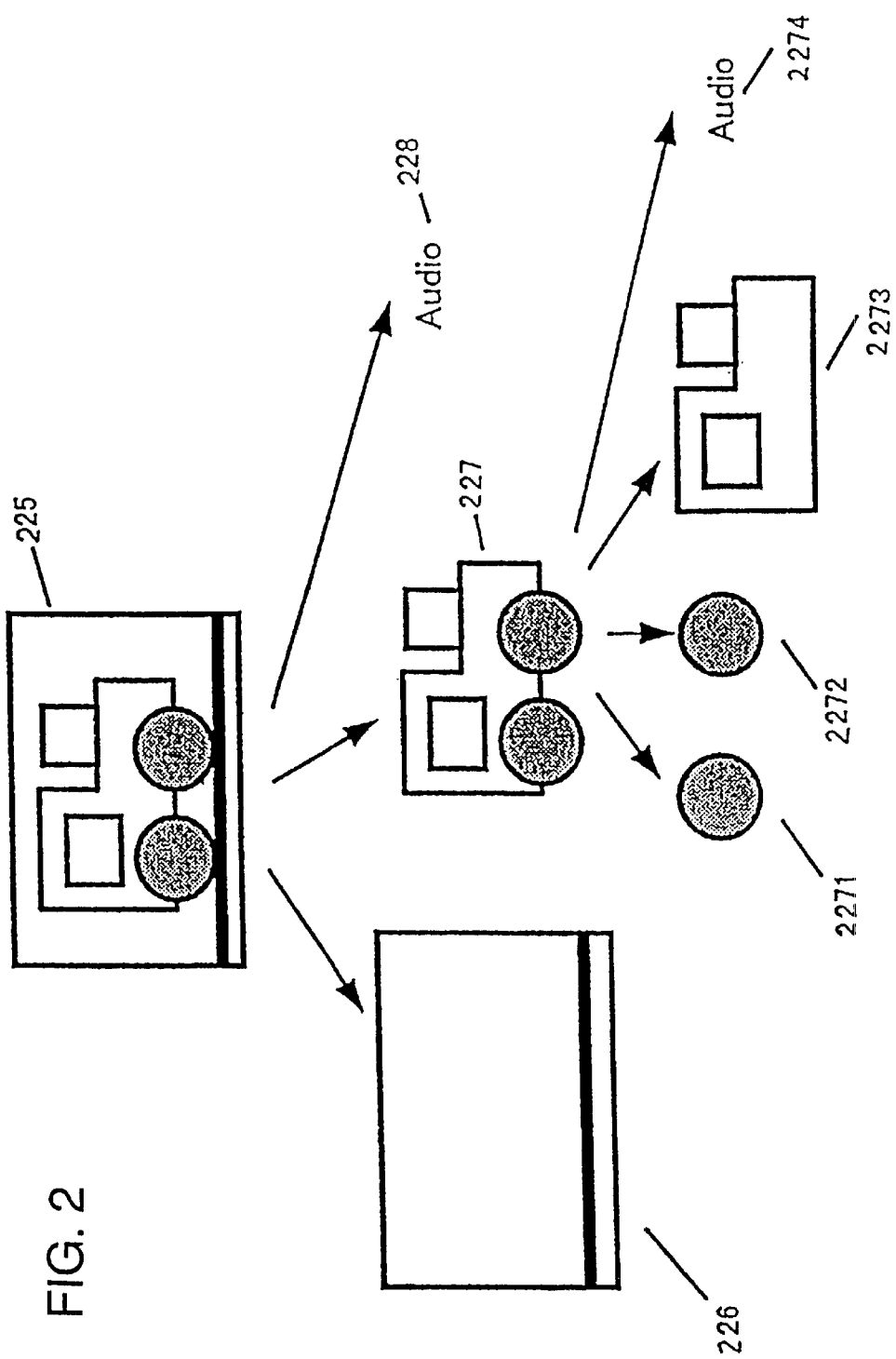
FIG. 2 is an explanatory chart of the data multiplexing apparatus used in the first exemplary embodiment of the present invention.
Figure 4:
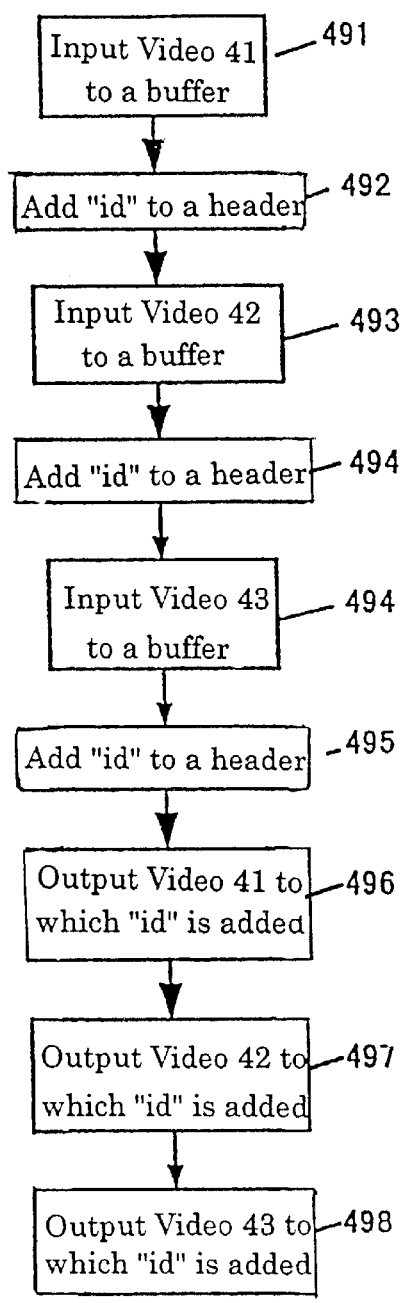
FIG. 4 is a flowchart depicting an operation of a CPU 46 disposed in a multiplexer 4 used in the first exemplary embodiment of the present invention.
Figure 5:
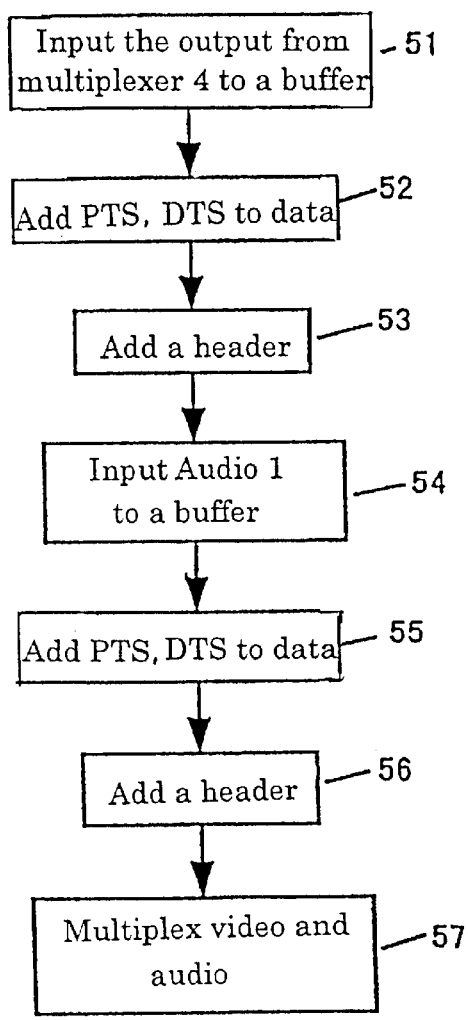
FIG. 5 is a flowchart depicting an operation of a CPU 14 disposed in a multiplexer 1 used in the first exemplary embodiment of the present invention.
Figure 6:
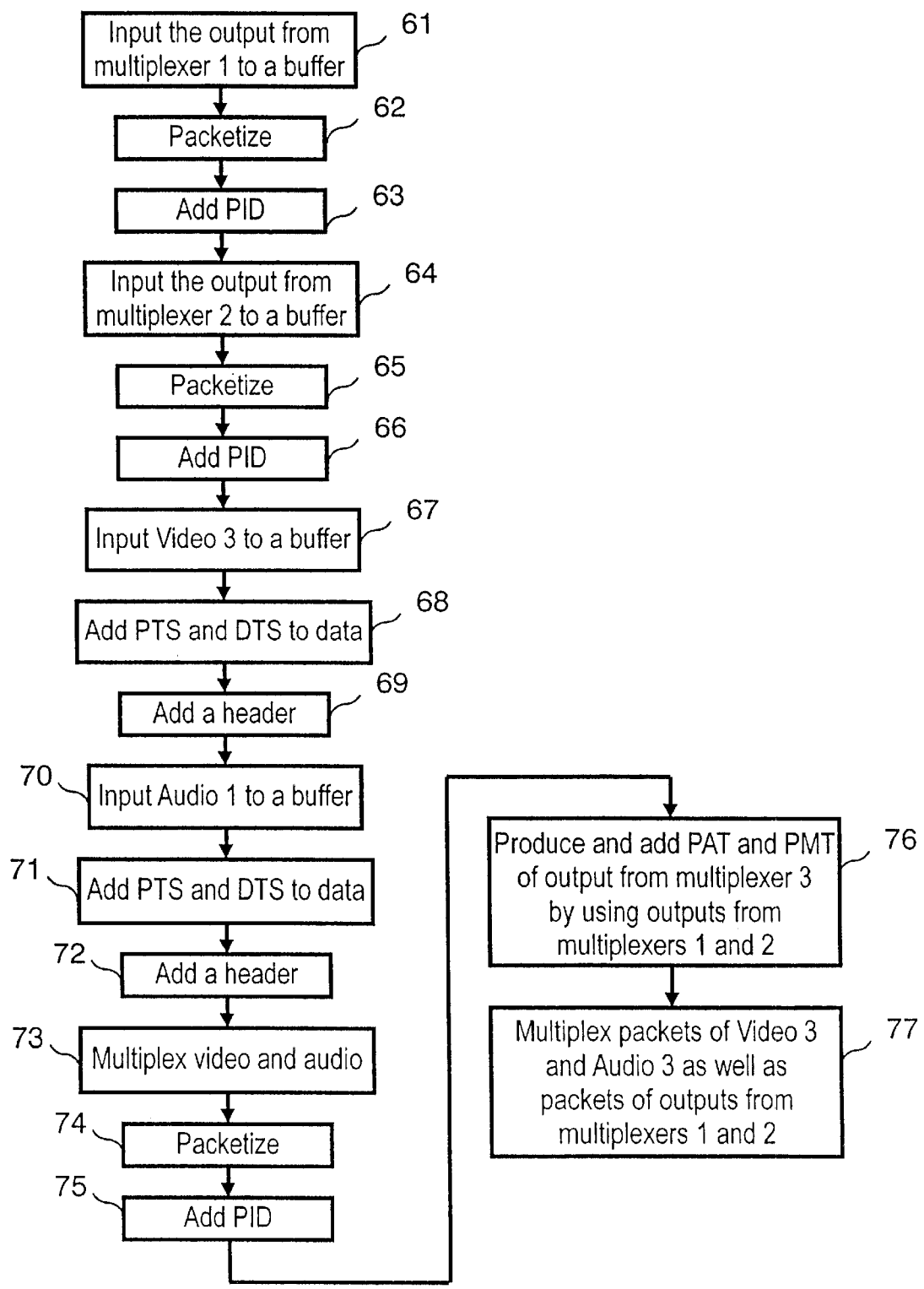
FIG. 6 is a flowchart depicting an operation of a CPU 38 disposed in a multiplexer 6 used in the first exemplary embodiment of the present invention.

FIG. 1 is a block diagram of a data multiplexing apparatus used in a first exemplary embodiment of the present invention. In FIG. 1, a first data multiplexer 1 comprises buffers 11, 12, a selector 13 and a CPU 14. Second, third and fourth data multiplexers 2, 3 and 4 comprise the same elements as the first data multiplexer 1. FIG. 2 depicts how to multiplex data. FIG. 3 depicts a structure of multiplexed data. FIG. 4 is a flowchart depicting an operation of a CPU 48 disposed in a multiplexer 4. FIG. 5 is a flowchart depicting an operation of a CPU 14 disposed in a multiplexer 1. FIG. 6 is a flowchart depicting an operation of a CPU 38 disposed in a multiplexer 6.

The method of multiplexing data in the data multiplexing apparatus constructed as above is now detailed with reference to FIGS. 1 to 6.

In an object coding method, an individual object is coded as shown in FIG. 2, which indicates a picture 225 one of a series of picture data coming with audio data.

The picture 225 comprises a background 226, a moving body 227 that moves in the background, audio data 228 of the background. Further, the moving body 227 comprises, a first wheel 2271, a second wheel 2272, a body 2273, and audio data 2274. When a large mountain exists in the background 226, or a person in the picture 225, the mountain or the person, which are not shown in the FIG. 2, can be designated as an object even they are not moving. In other words, the way how to define an object depends on a purpose of a picture processing.

When the picture taken apart into objects as above is compressed for coding, each minimum unit of the objects, i.e., 226, 2271, 2272, 2273, 2274, and 228, is compressed. Next, each of the compressed objects is multiplexed by the data multiplexer showed in FIG. 1.

First, the objects 2271, 2272 and 2273 constituting the moving body 227 are compressed. The compressed above objects are handled as Video 41, Video 42 and Video 43 (PES step), and multiplexed by the multiplexer 4 following the flowchart shown in FIG. 4. In other words, picture data are read into the buffers, and an "id" is added to each header of the picture data for easy recognition, then the individual object is multiplexed and tapped off.

Second, an output from the multiplexer 4 and Audio 1 (corresponding to the object 2274) are multiplexed by the multiplexer 1 following the flowchart shown in FIG. 5. When picture data and audio data are multiplexed, both the data must be synchronized and reproduced. The time information such as PTS, DTS, etc. necessary for synchronization and reproduction is thus added to each data. Further, headers for identifying audio or video are added, then the data are multiplexed. In this case, an output of the multiplexed picture from the multiplexer 4, which comprises smaller objects, is treated as one picture data.

Third, the person and other objects, as previously described not shown in FIG. 2, are multiplexed by the multiplexer 2 same as the multiplexer 1 did. The multiplexer 3 multiplexes the outputs from the multiplexers 1, 2, video 31 that corresponds to the background (object 226), and Audio 32 that corresponds to audio of the background (object 228), to form a packet, then outputs the packet.

FIG. 6 shows an operation of the CPU 38 in the multiplexer 3. In FIG. 6, the outputs from the multiplexers 1 and 2 are fed into buffers on steps 61 and 64 to form packets. At the same time, different PIDs are added on steps 63 and 66. In other words, the object relative to the moving body 227 has a different PID from that of the object relative to the person.

PTS and DTS are added to Video 31 and Audio 32, each corresponding to the object relative to the background and the object relative to the background audio respectively, and then they are multiplexed, and formed into packets. Then, PIDs different from the outputs of the multiplexers 1 and 2 are added.

Next, PAT and PMT that indicate relations between contents of packets and PIDs are produced. The following packets are multiplexed every given time and the outputs of the multiplexer 3 are obtained: packets of PAT, PMT and an output of the multiplexer 1, packets of the outputs of the multiplexer 2, and a packet of multiplexed Video 31 and Audio 32.

As the above description proves, PIDs are provided to each physical object such as a background, a moving body and a person, thereby saving multiple PIDs which should have been provided if multiple objects had existed in one article. In other words, a PID is provided to each master object, and upon request, components (slave objects) constituting the article are provided with PIDs as lower objects. As shown in FIG. 3(c), one picture comprising objects is controlled by PAT and PMT, thereby identifying a PID of an object based on the PAT and PMT. As a result, a specific object in a multiplexed packet can be picked out or replaced easily with other objects by designating the PID of one object.

Exemplary Embodiment 2

A method of multiplexing data in the second exemplary embodiment is described hereinafter with reference to the attached drawings.

Figure 8:
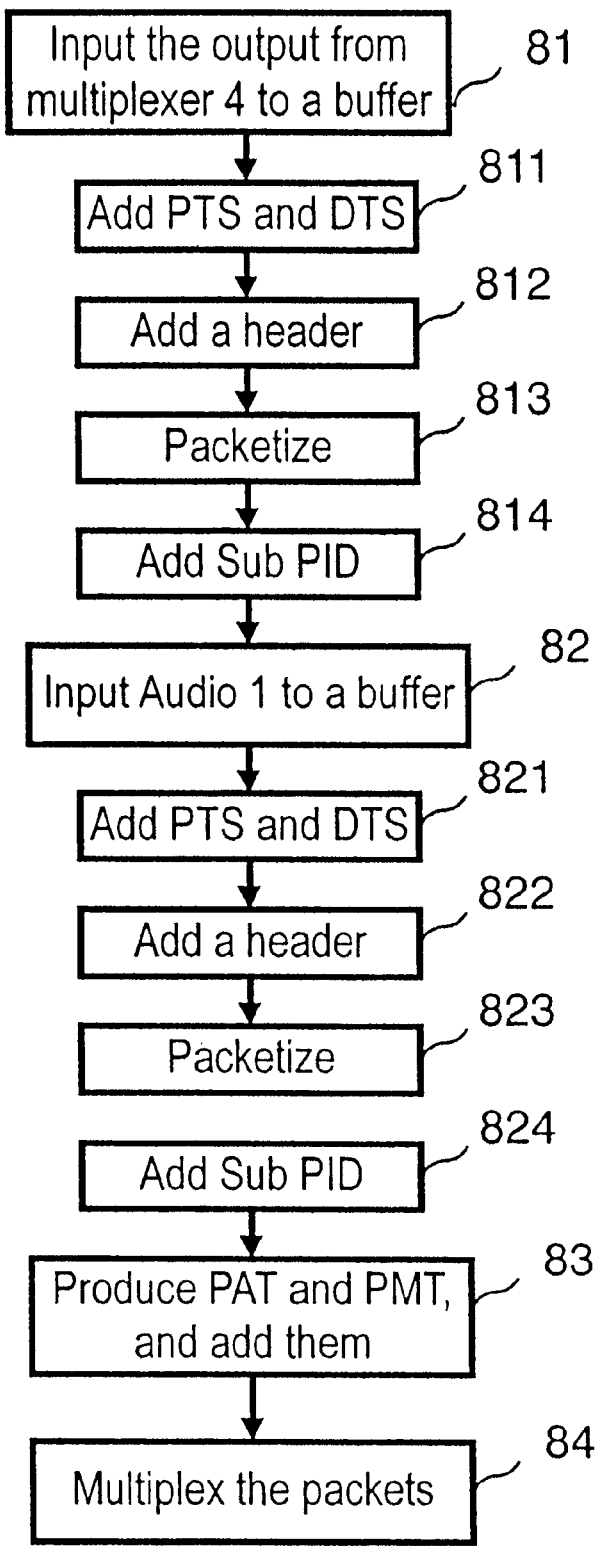
FIG. 8 is a flowchart depicting an operation of a CPU 14 disposed in a multiplexer 1 used in the second exemplary embodiment of the present invention.
Figure 9:
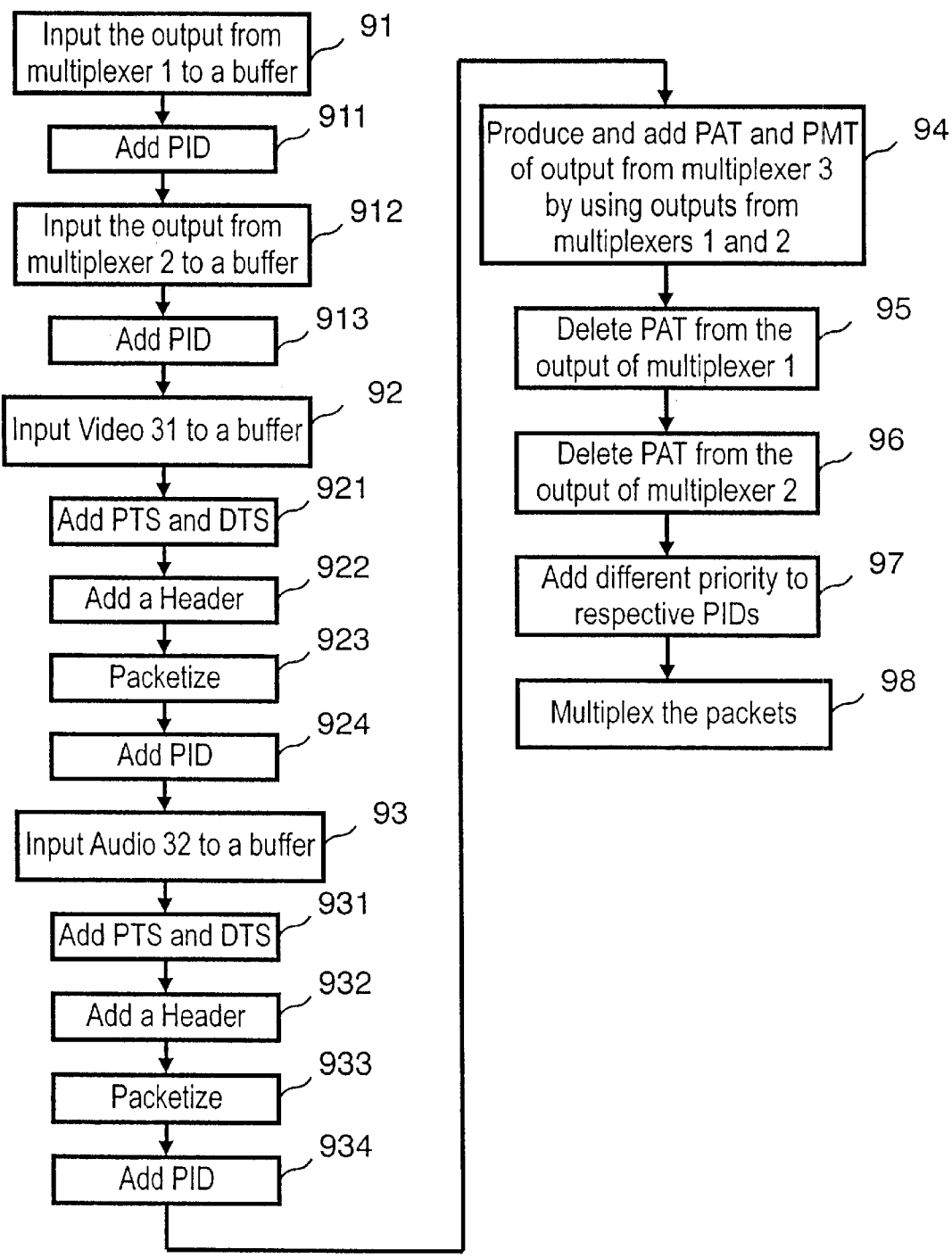
FIG. 9 is a flowchart depicting an operation of a CPU 38 disposed in a multiplexer 6 used in the third exemplary embodiment of the present invention.

FIG. 7 is an explanatory chart depicting data multiplexed in a second exemplary embodiment of the present invention. FIG. 8 is a flowchart depicting an operation of a CPU 14 disposed in a multiplexer 1. FIG. 9 is a flowchart depicting an operation of a CPU 38 disposed in a multiplexer 6.

The multiplexer shown in FIG. 1 is utilized in the second exemplary embodiment; however, the method differs from that in the first exemplary embodiment. The operation of the multiplexer 4 is the same that used in the first exemplary embodiment. A difference between the first and the second embodiments is found in multiplexing packets of audio data and picture data. In the first exemplary embodiment, they are multiplexed in a PES level, for example, Audio 32 that is not in a packet form; however, in this second exemplary embodiment, both are handled in packet forms.

First, as shown in FIG. 8, synchronizing time information PTS and DTS are added to the outputs (objects 2271, 2272 and 2273) from the multiplexer 4, then the resultant objects are packetized into packets, and PIDs are added. These PIDs are not the PIDs of the outputs from the final multiplexer, but they are sub-PIDs for identifying the objects. Audio 1 is formed into a packet following the same procedure. Further in the multiplexer 1, PAT and PMT are produced from the sub-PIDs which have been added to the picture data and audio data, and the packets are multiplexed before being tapped off.

Second, following the flowchart in FIG. 9, the multiplexer 3 inputs the output packets of the multiplexers 1 and 2, then different PIDs are added to the outputs thereby identifying respective objects (step 91–step 913.) The picture objects Video 31 and Audio 32 belonging to the background are packetized into packets through the same method that used in the multiplexer 1; however, because their hierarchical classes rises one step up, PIDs instead of Sub-PIDs are added (step 92 through step 934.) During the outputting of multiplexers 1 and 2, the Sub-PIDs of each multiplexed PAT are rewritten upon request so that no duplication in the multiplexers 1 and 2 occurs. Further, these PATs are utilized to produce the output, i.e., PAT and PMT, from the multiplexer 3, and together with data, these outputs are packetized into packets and tapped off.

Before the packets are multiplexed, each packet is given a priority order in step 97 shown.in FIG. 9. The respective priority orders are assigned to the individual object. For example, the important object 1 is given a higher priority order, and the background that may be lost is given a lower priority order. In this exemplary embodiment, the multiplexer 1 is given the highest priority order, then the multiplexer 2 are given the second highest order, Video 31 is the third and Audio 32 is the fourth priority order. This priority order system can identify which object must be protected firstly when errors occur in the transmission line.

FIG. 7(a) is an output example of the multiplexer 3. FIG. 7(b) is a packet example when the packets with the same PID are collected, which example corresponds to the output status of the multiplex 3 from which the packets of Video 31 and Audio 32 have been deducted. FIG. 7(c) is an output example PAT of the multiplexer 3.

What differs in FIG. 7(d) from the prior art is that the PID of PMT of the object 1 is included besides the PIDs of PES of picture and audio data. FIG. (e) is an example of PMT of the object 1. When the object 1 is divided into further smaller objects, PID of PMT of an object 11 are described as shown in FIG. 7(e). In this second exemplary embodiment, when PAT of the object 3 and PMTs of each object are analyzed, PID and Sub-PID are identified, the added PATs in the multiplexer 1 and 2 are thus not needed any more in the multiplexer 3. Those added PATs are therefore deleted.

According to this second exemplary embodiment, the same effect as the first exemplary embodiment can be expected, and further, smaller objects can be formed into packets, which makes it easy to feed the data into the transmission line. Because the PID is searched by a multiplex pointer of PMT, one object is handled by the corresponding one PID, whereby the object-oriented operation can be handled more easily.

In the above description, two hierarchical classes are employed, i.e., one for PID and Sub-PID, and the other for objects; however, the present invention is not limited to this example, but multiple classes can be applied to, e.g., PID, Sub-PID, Sub-sub-PID . . . , and whereby a multiplex can be practiced with the same operation as this second exemplary embodiment.

In this embodiment, a PID of a PMT is described in PAT, and further, a PID of a PMT of other object is described in the PMT; however, the table packet is not limited to this format only. For instance, when PIDs of PMT of each object can be directly described into PAT, the same effect can be obtained provided a number of objects is small.

Exemplary Embodiment 3

The third exemplary embodiment is described hereinafter with reference to the attached drawings.

Figure 10:
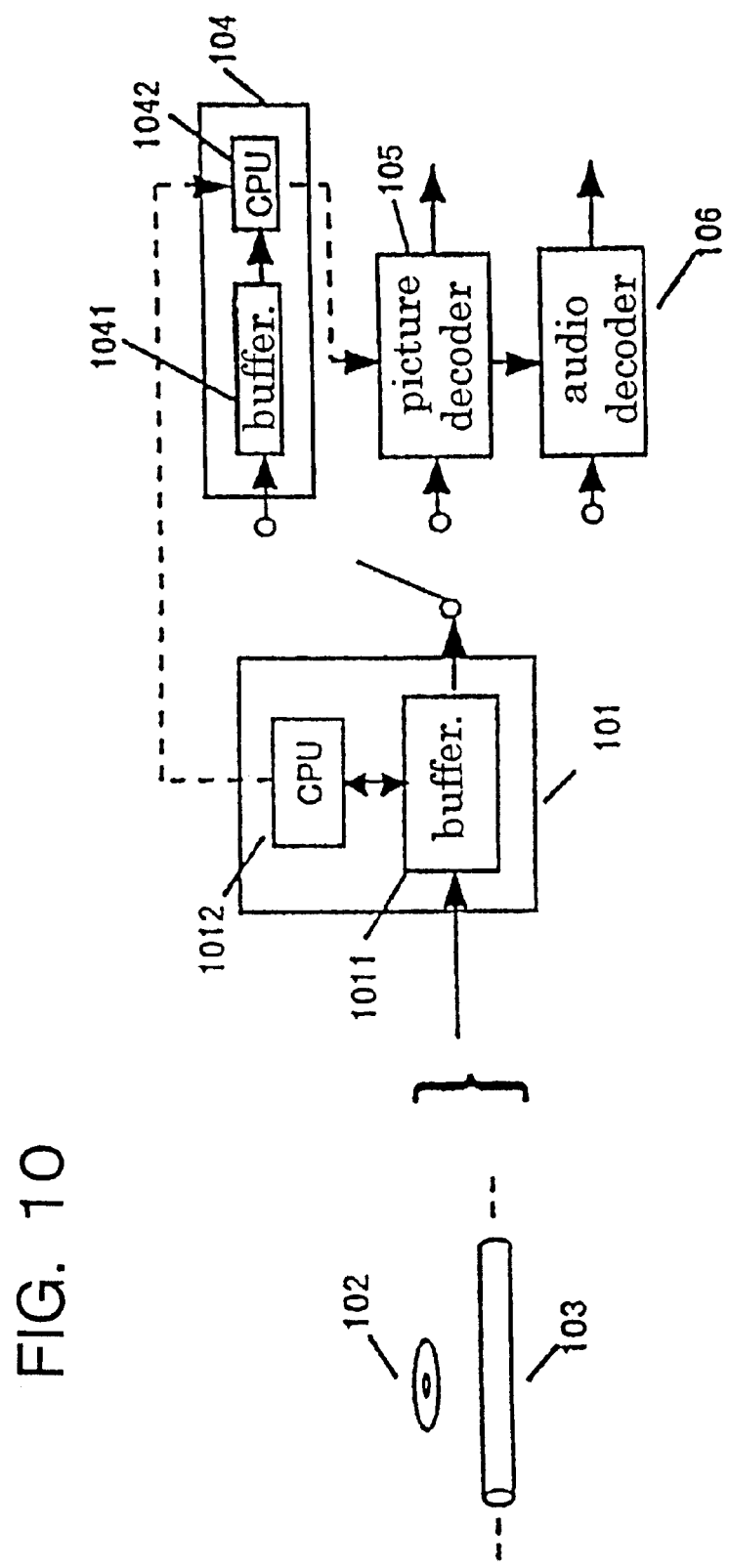
FIG. 10 is a block diagram of a data reproducing apparatus used in a third exemplary embodiment of the present invention.

FIG. 10 is a block diagram of a data reproducing apparatus, which reproduces multiplexed data, used in a third exemplary embodiment of the present invention. The apparatus comprises: a data inverse multiplexing section 101, a controller 104, a picture decoder 105, and an audio decoder 106.

Figure 11:
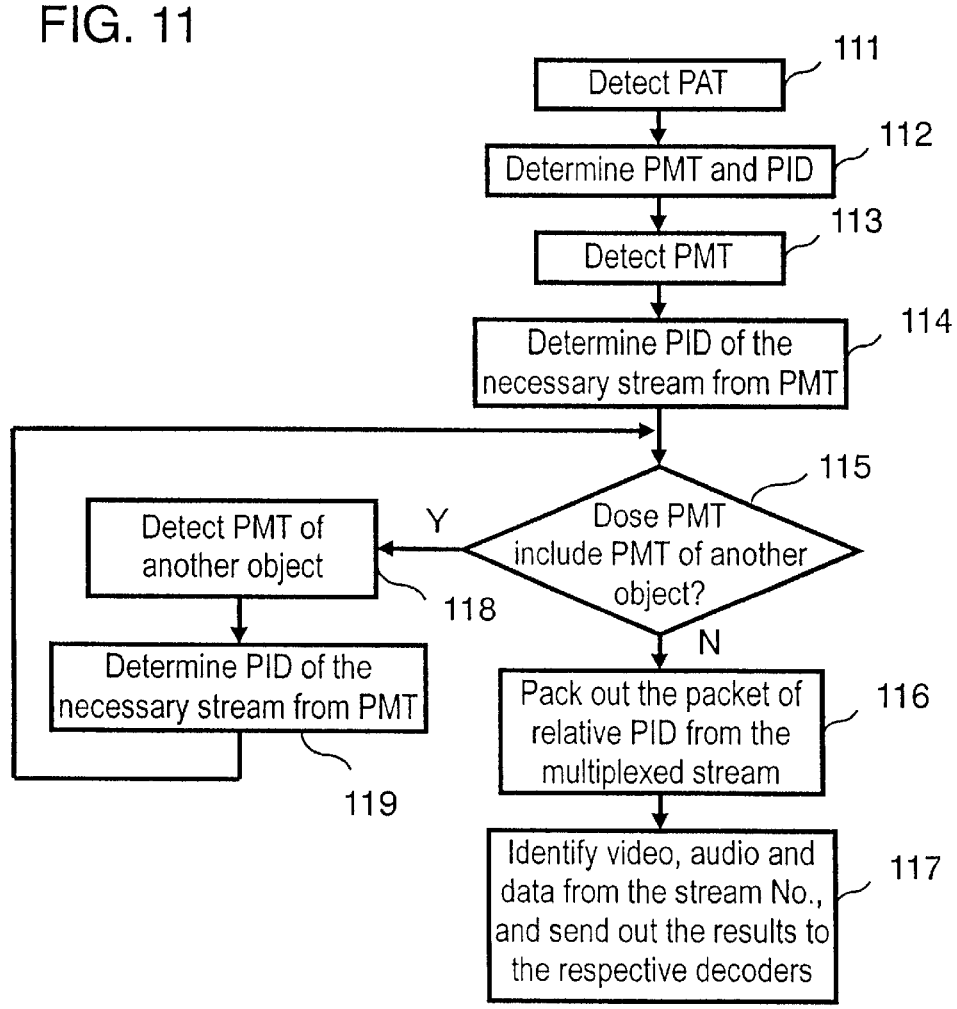
FIG. 11 is a flowchart depicting an operation of a CPU 1012 disposed in a data inverse-multiplexing section 101 used in the third exemplary embodiment of the present invention.

FIG. 11 is a flowchart depicting an operation of a CPU 1012 disposed in a data inverse-multiplexing section 101. FIG. 12 is a flowchart depicting an operation of a CPU 1041 disposed in the controller 104. The multiplexed data used in the second exemplary embodiment is fed into the inverse multiplexing section 101 via a storing media 102 or a transmission line 103.

The inverse multiplexing section 101, first, detects PAT and PMT, and determines a PID of a desirable program. When a PMT includes a PID of a PMT of another object, the section 101 detects the PMT again, and determines necessary PID from the detected PMT. This process (step 111 through step 114) is repeated to determine the PIDs of picture, audio and data necessary for reproducing the program.

When the PMT includes a PID of a PMT of another object, a specific PMT of another object must be detected from the packet, therefore, it requires some time to determine a PID of a packet necessary for reproducing. In order to minimize this time, it is one of ideas that the multiplexers sequentially send out the PMTs of relative objects. Through the above procedure (steps 115 and 116), the PID is determined, and each packet is picked out from respective streams. Then, the data is transmitted to the controller 104, also the picture and audio are transmitted into respective decoders 105 and 106 (step 117.)

Figure 12A:
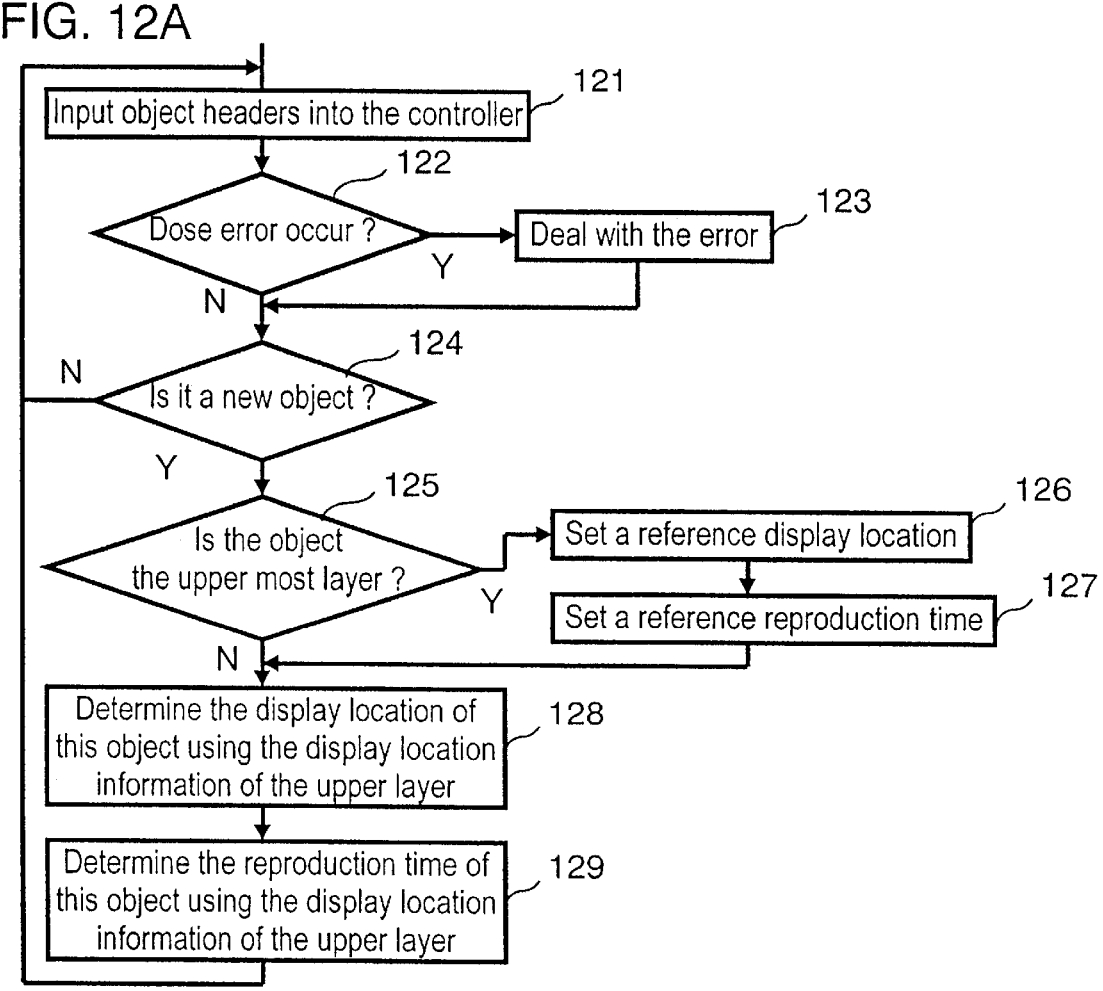
FIG. 12($a$) is a flowchart depicting an operation of a CPU 1041 of a controller 104 used in the third exemplary embodiment of the present invention.

The controller 104 operates as follows [refer to FIG. 12(a)]. First, input headers of each object, at the same time, input error flags produced during the transmission or storing. An error flag reminds the receiver of an error, then the receiver starts with the error process (step 123) in FIG. 12(b).

Figure 12B:
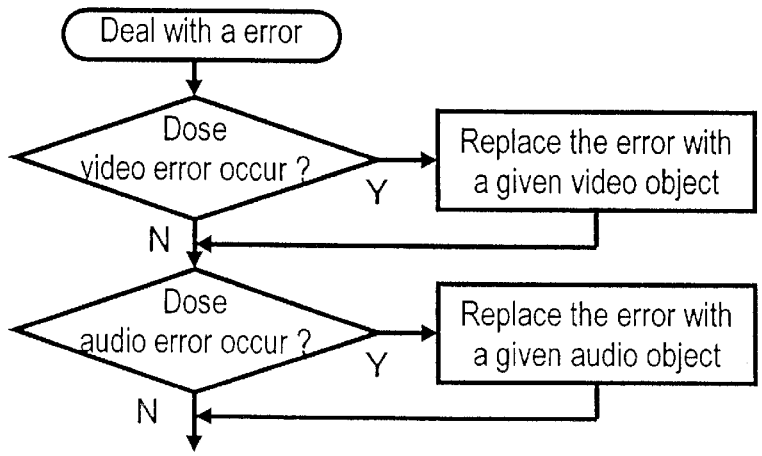

The error process in FIG. 12(b), in principle, is to replace an error in the object with another object given by the decoder. For instance, a picture object is impossible to reproduce due to an error, the picture object can be replaced with a same pattern as the background or a transparent article. In the case of an audio object, it can be replaced with a given background music.

The error process can be interpolated instead of being replaced. For a uniform picture such as a background, an interpolation within the background (the same object) can conceal the error with little distinction.

When no error exists, the first step should be restored to "input" of an object header and continue the operation provided no new object exists as shown in step 124. When a new object exists, display location or time information of reproduction, which is described in the header of this new object, is read out, and this information is set in the respective decoders 105 for picture and 106 for audio as shown in FIG. 10.

Because the upper most layer such as the background is a reference for display and reproduction, the reference display location as well as reference reproduction time of the upper most layer is set first. Objects of lower layers are decoded, reproduced and displayed utilizing the information of display and reproduction of the upper layer, such as a picture size, a sampling frequency, a frame rate, a color space, and the like. As such, the lower layer succeeds to the information of the upper layer for reproduction, whereby a consistent picture can be reproduced even with different objects.

Regarding how to send a start time of reproduction, a timing of reproduction-start or an off-set from reproduction-start of the reference picture can be sent, because each object has its own PTS and DTS referenced to respective objects.

In the above description, a reproduction-start time is detailed; however, when a picture comprises plural objects, display locations of the objects must be sent. This display location can be sent as an off-set to the upper layer or an absolute location to the background.

The above description proves that the data stream multiplexed through the method in the second exemplary embodiment can be correctly decoded, reproduced and displayed.

This third exemplary embodiment proves that the data stream multiplexed by the method detailed in the second exemplary embodiment. The decoding method of this third exemplary embodiment also can decode the data stream multiplexed by the method detailed in the first exemplary embodiment with minor changes in the flowcharts in FIGS. 11 and 12.

In this third exemplary embodiment, the data is reproduced and displayed by referencing to the display start time and display location of the upper layer. However, as described in the second exemplary embodiment, the upper layer is sometimes transmitted lowering its priority order, thus the upper layer would lose the data. In such a case, data is reproduced and displayed referencing to the display start time and display position of an object located in the upper most layer, where the object constitutes the data received correctly.

Exemplary Embodiment 4

A method of reproducing data in the fourth exemplary embodiment is now described hereinafter by rreferring to the attached drawings.

Figure 13:
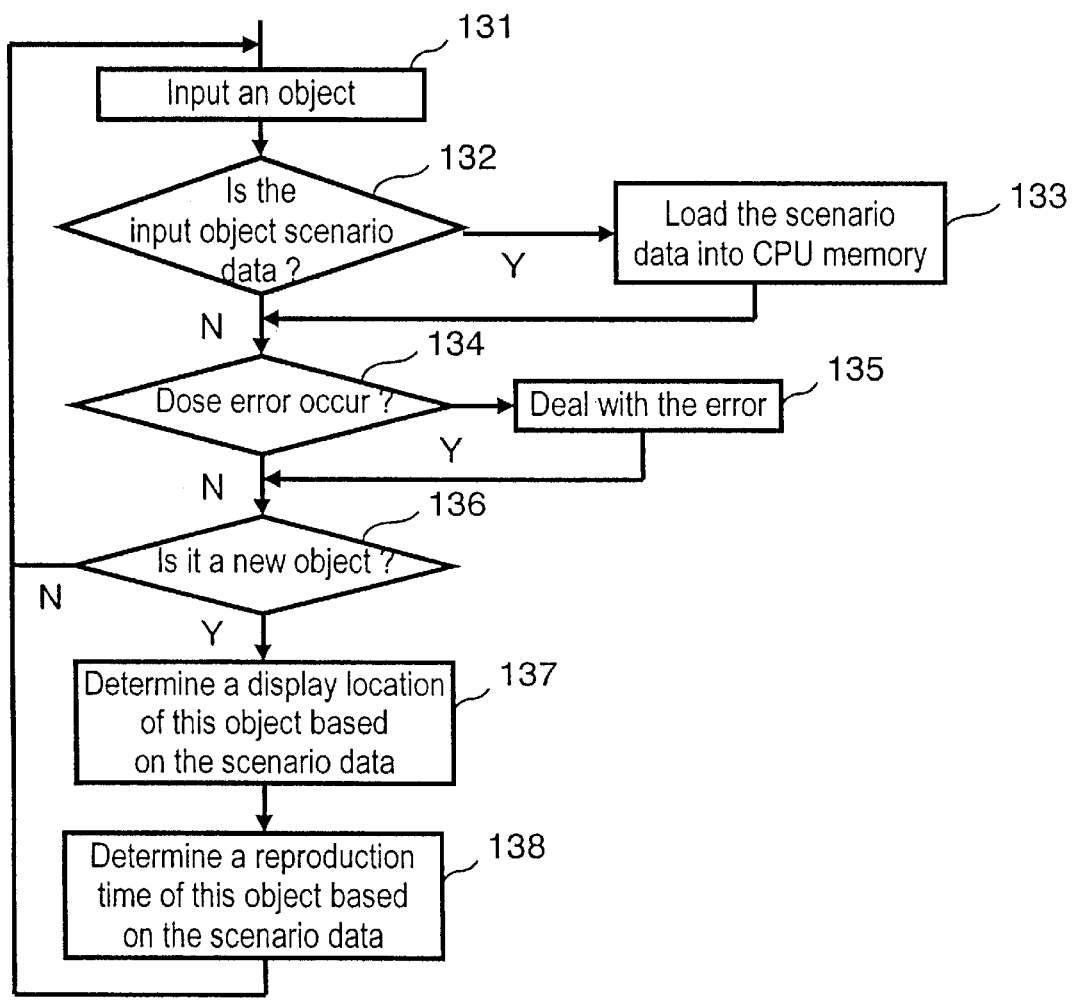
FIG. 13 is a flowchart depicting an operation of the CPU 1041 of the controller 104 used in a fourth exemplary embodiment of the present invention.

FIG. 13 is a flowchart depicting an operation of the CPU 1041 of the controller 104. The method of this fourth exemplary embodiment differs from that of the third embodiment in the following point: scenario data, which describes when and where an object should be reproduced in a series of pictures, are multiplexed and sent beforehand, and a reproduction apparatus reproduces the object based on the scenario data This fourth exemplary embodiment can produce the same effect as the third embodiment does, further, this fourth exemplary embodiment can combines various objects and display them with ease, e.g., a picture produced by computer graphics and a natural picture are combined and displayed. In this case, the multiplexer must know the contents of all the pictures.

Exemplary Embodiment 5

A method of multiplexing data, used in the fifth exemplary embodiment is hereinafter described with reference to the attached drawings.

Figure 14:
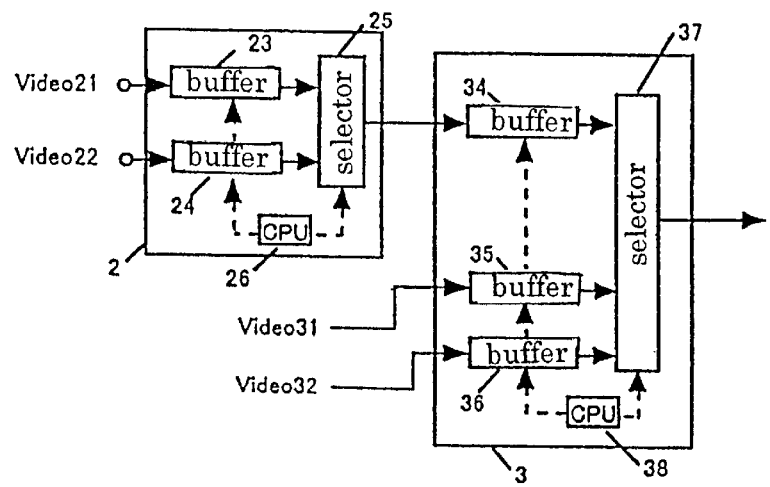
FIG. 14 is a block diagram of a data multiplexing apparatus used in a fifth exemplary embodiment of the present invention.
Figure 15A:
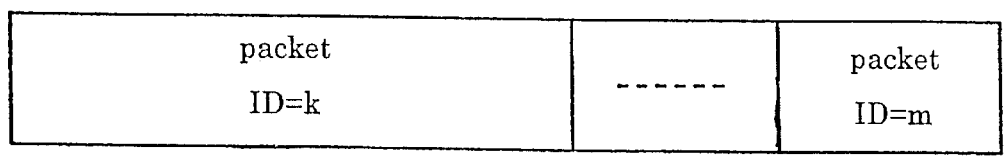
FIG. 15 is an explanatory chart depicting a structure of data multiplexed in the fifth exemplary embodiment of the present invention.
Figure 15B:
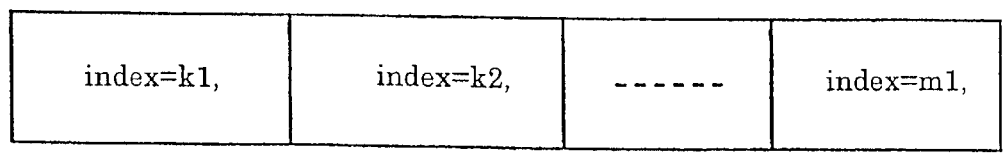
Figure 16:
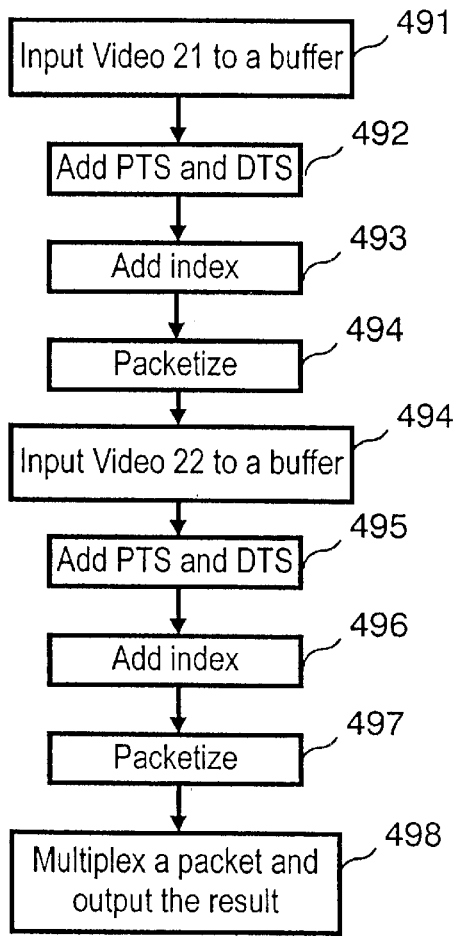
FIG. 16 is a flowchart depicting an operation of a CPU 26 disposed in a data multiplexer 2 used in the fifth exemplary embodiment of the present invention.
Figure 17:
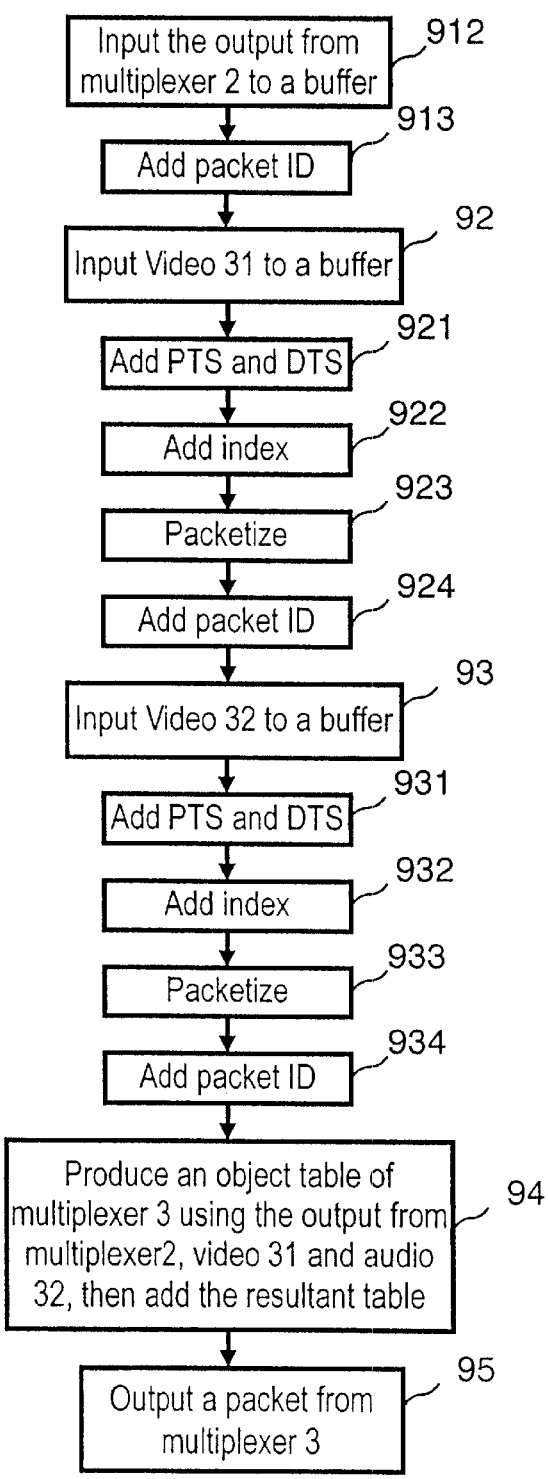
FIG. 17 is a flowchart depicting an operation of a CPU 38 disposed in a data multiplexer 3 used in the fifth exemplary embodiment of the present invention.
Figures 18, 19:
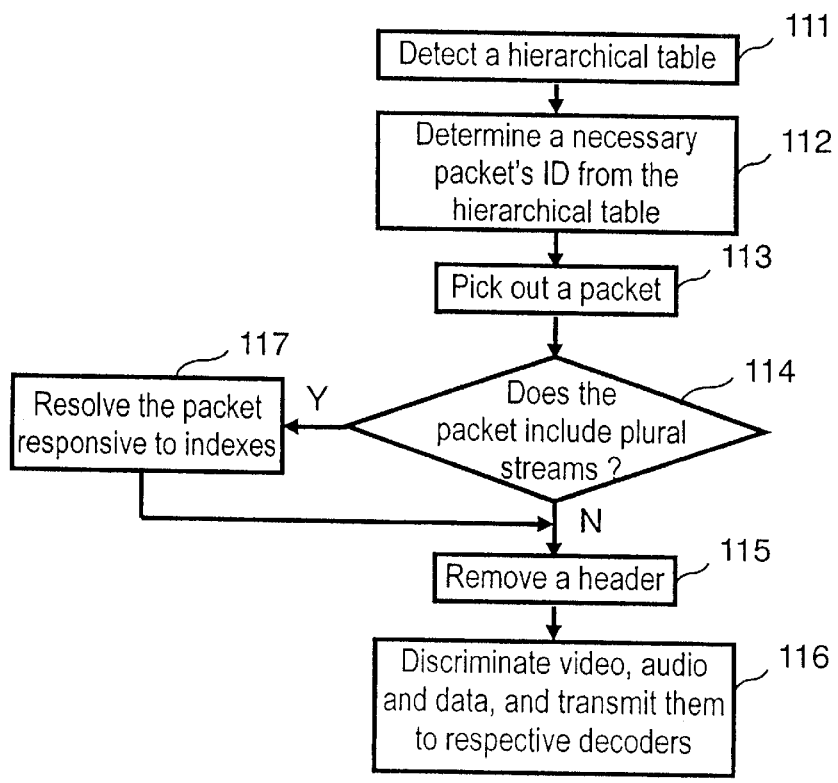
FIG. 18 is a hierarchical table used in the fifth exemplary embodiment of the present invention.
FIG. 19 is a flowchart depicting an operation of a CPU 1012 disposed in a data reproducing apparatus 101.
Figure 20A:
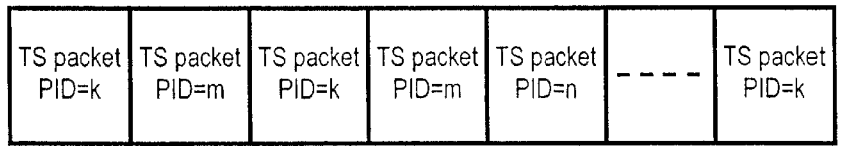
FIG. 20(a) shows a structure of multiplexed data.
Figure 20B:
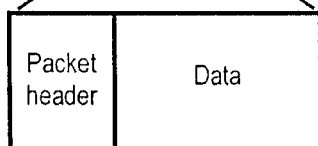
FIG. 20(b) shows a TS packet structure.
Figure 20C:
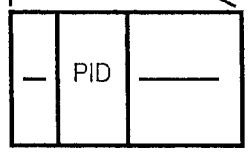
FIG. 20(c) shows a header structure.
Figure 20D:
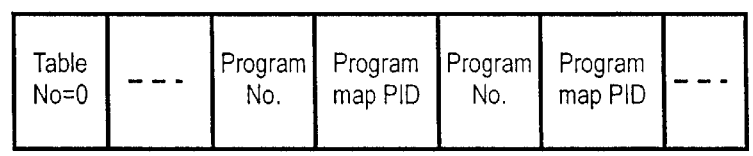
FIG. 20(d) shows a PAT structure and FIG. 20(e) shows a PMT structure.
Figure 20E:
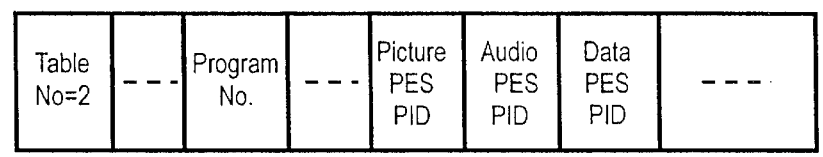
Figure 21A:
FIG. 21(a) shows a PES packet.
Figure 21B:
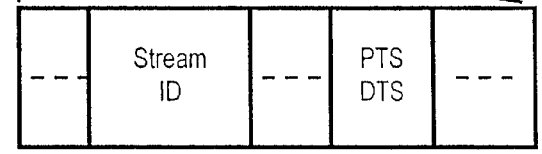
FIG. 21(b) shows a header structure.
Figure 22:
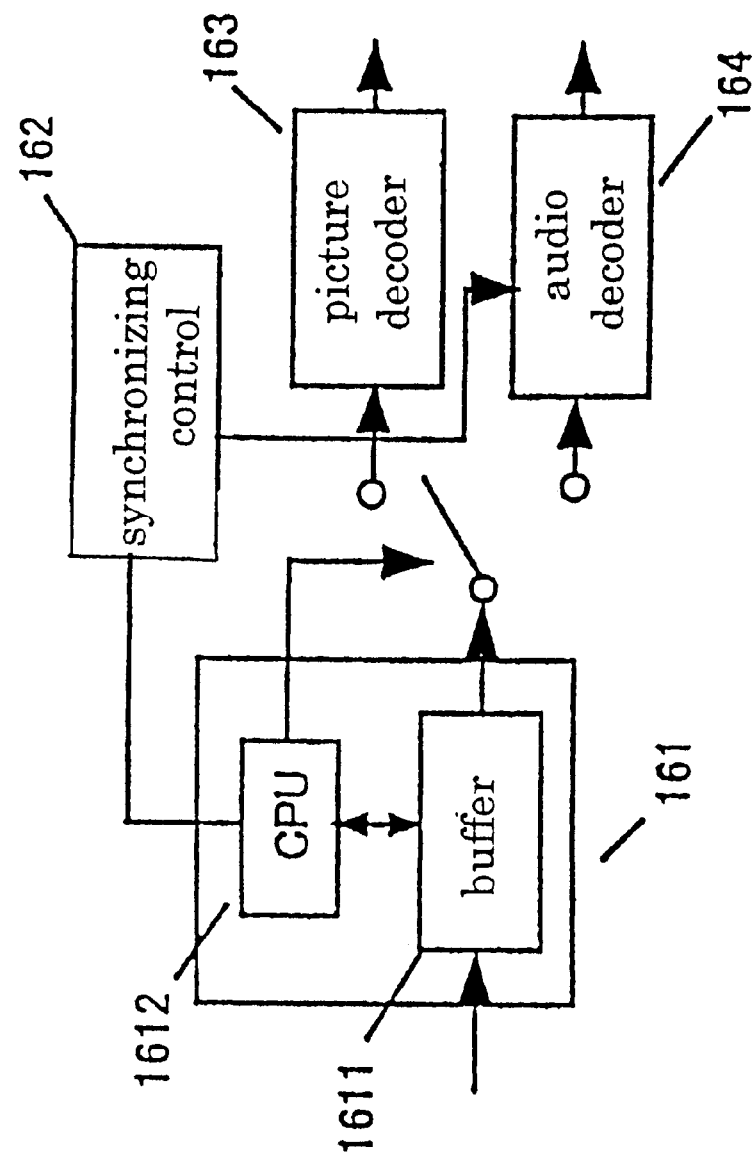
FIG. 22 is a block diagram of a conventional multiplexed-data reproducing apparatus.
Figure 23:
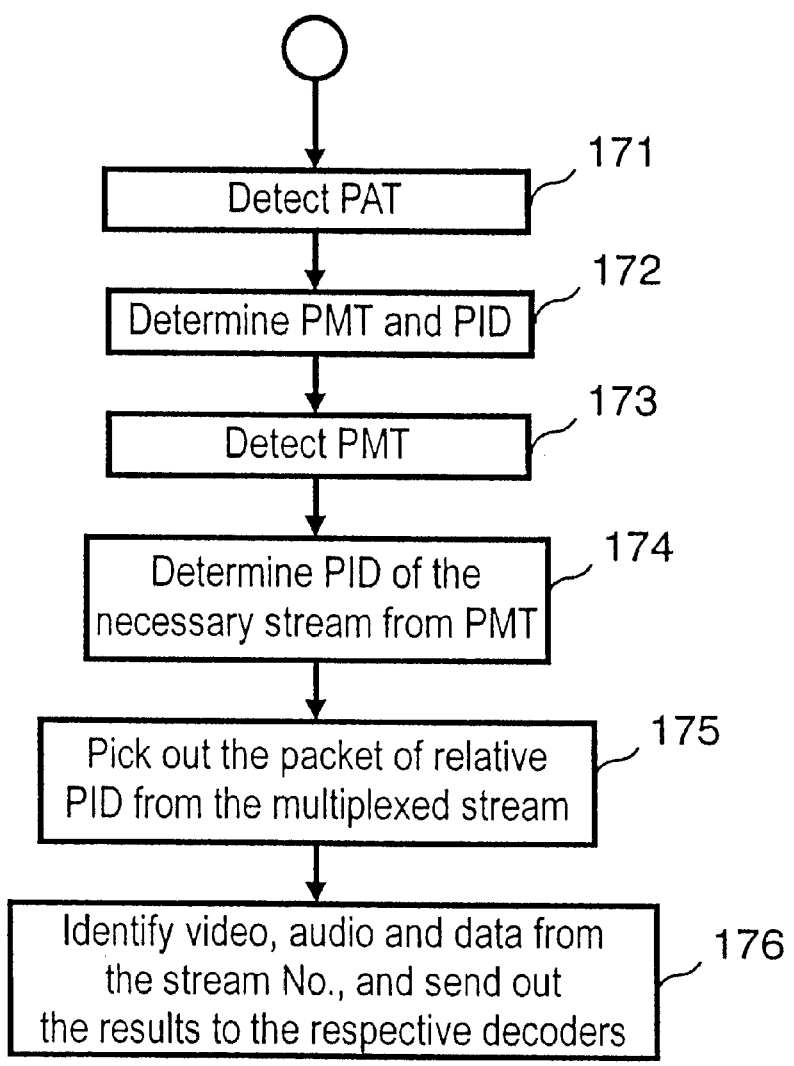
FIG. 23 is a flowchart depicting an operation of a CPU 1312 disposed in the conventional multiplexed-data reproducing apparatus.

FIG. 14 is a block diagram of a data multiplexing apparatus used in a fifth exemplary embodiment of the present invention. In FIG. 14, a block 2 is the same as the second multiplexer used in the first exemplary embodiment and shown in FIG. 1. A block 3 is approximately the same as the third multiplexer used in the first exemplary embodiment and shown in FIG. 1. FIG. 15 is an explanatory chart depicting a structure of data multiplexed. FIG. 16 is a flowchart depicting an operation of a CPU 26 disposed in a data multiplexer 2. FIG. 17 is a flowchart depicting an operation of a CPU 38 disposed in a data multiplexer 3. FIG. 18 is a hierarchical table depicting relations between layers of the objects.

The data multiplexing method used in the data multiplexing apparatus constructed as above is detailed with reference to the FIGS. 14 to 7.

As shown in FIG. 14, a multiplexing operation is basically the same that used in the first exemplary embodiment with the following exceptions. (1) In the multiplexer 2, Video 21 and Video 22 instead of Video and Audio are indexed and multiplexed, (2) Video 31 and Video 32 are fed into the multiplexer 3.

In this exemplary embodiment, the multiplexer 2 is attached to a coding apparatus, and the multiplexed data produced therein is supposed to be sent out by a network adapter, i.e., the multiplexer 3. When digital data access the Internet via Ethernet through protocol, both of the multiplexed data and the data not to be multiplexed are mapped as they are in a protocol packet of the Internet.

FIG. 15(*a*) depicts an output from the data multiplexer 3, where a packet of ID=k and a packet of ID=m are not necessary continued, and another packet is not always between both these packets; however, both these packets are supplied to the same transmission line, e.g., Ethernet. When the Internet protocol "ip" is used, packets are transmitted through the same port or through different ports. In this case, regardless continuous packets, discontinuous packets, and a number of ports, the packets are supplied to the same transmission line, which can be considered that the packets are multiplexed.

FIG. 15(*b*) details the content of the packet shown in FIG. 15. In this embodiment, Video 21 and Video 22 with indexes of k1 and k2 respectively are multiplexed, as shown in FIG. 16. Then, before the multiplexed data is supplied to the transmission line, ID=k is added to the packet in the data multiplexer 3.

On the other hand, Video 31 and Video 32 are not multiplexed but indexes are attached thereto, and Video 31 and Video 32 are formed into a packet, then the packet is supplied to the transmission line. The TS packet used in the first exemplary embodiment is not required in this embodiment, and yet data comprises plural objects can be transmitted by using a network such as Ethernet.

When data quantity of objects are small, the data multiplexer 2 multiplexes the data before they are transmitted to a network. Therefore, an overhead including a header can be avoided, as a result, an efficiency transmission can be expected.

The hierarchical classification is now described hereinafter with reference to the picture in FIG. 2. FIG. 18 is a hierarchical table depicting hierarchical relations between respective digital data, and lists an example table that is transmitted together with a packet by the third multiplexer 3. The details of the table in FIG. 18 are approximately the same what PAT, PMT showed in the second exemplary embodiment; however, they are described in different ways. When a signal is transmitted using the TS packet, PAT and PMT can be used; however, PAT and PMT are not available in this embodiment, therefore, unless the hierarchical information of the objects is transmitted, the decoding apparatus cannot pick out a specific object or decode an object selectively.

The table in FIG. 18 shows mapping data of hierarchical relations between digital data streams and indexes as well as digital data streams and packets. Each digital datum is attached with a stream "id", and this table identifies which stream is transmitted by which packet. When the audio object shown in FIG. 2, a stream "id" is firstly added to the audio object in this example described now. The stream "id"s are assigned to each object as follows:

Stream "id=1" to the background 226 in FIG. 2,
"id=2" to the moving body 227,
"id=3" to the background audio 228,
"id=4" to a part 2271 of the moving body,
"id=5" to a part 2272 of the moving body,
"id=6" to a part 2273 of the moving body,
"id=7" to audio 2274 coming with the moving body.

The multiplexer 2 multiplexes the streams corresponding to the moving body and its parts, i.e., id=2,4,5, and 6 (In FIG. 14, they are not listed as inputs.) The multiplexer 3 multiplexes the streams corresponding to the background and its audio, i.e., id=1,3 7, and the resultant multiplexed packet from the multiplexer 2.

Since indexes, in general, are given together with consecutive numbers starting from "1" to each packet, the packets of "id=1 ", "id=3" and the packet multiplexed by the multiplexer 2 have the same index. (In FIG. 18, the streams 1, 2, and 3 are assigned the respective packet Nos. 1, 2, and 3, and assigned the same index "1".) Stream "id=7" is assigned to the audio accompanying the moving body, and thus belongs to the object 227. Therefore, the indexes are assigned consecutive numbers of the stream "id=2,4,5, and 6" (In FIG. 18, they have the same packet No. 2., and the indexes are assigned the consecutive numbers 1,2,3 and 4.) The packet "id" is assigned to the respective packets multiplexed by the multiplexer 3. Accordingly, the stream "id=1,2, and 3" are assigned packet "id" independently of the packet No. 1,2, and 3. Because the stream "id=4,5 and 6" are multiplexed to the same packet having the stream "id=2", they have the same packet "id=2".

FIG. 18 shows parent indexes, child indexes, parent packet "id" and child packet "id". The parent means a high hierarchical class and the child means a low class. In FIG. 18, the moving body assigned packet No. 2 is a parent packet, thus its stream "id=2" is assigned packet No. 2, while its parts and accompanying audio are child packets, thus their stream "id=4,5,6 and 7" are assigned packet Nos. 2,2,2, and 4 respectively. In order to show the parent-child relation, respective packet Nos. are put in the columns of parent packet "id" and child packet "id".

FIG. 19 is a flowchart depicting an operation of CPU 1012 disposed in the data reproducing apparatus shown in FIG. 10 that reproduces the data multiplexed in this embodiment. The hierarchical table shown in FIG. 18 is supposed to be transmitted together with picture data and audio data.

In FIG. 19, firstly, the hierarchical relation and packet IDs of the objects are reproduced from the hierarchical table shown in FIG. 18. Secondly, packet IDs corresponding to the necessary objects are judged based on user's instruction, and the resultant IDs are picked out from the stream. Based on the objects in FIG. 17, the hierarchical table shown in FIG. 18 can tell which packet must be picked out in order to reproduce a certain object. For instance, when an object having a stream "id=2" (corresponding to the moving body per se) is reproduced, "id=2, 4" can be judged based on the packet "id=2" and child packet "id". Then the packets of "id=2, 4" are picked out from the stream, and they are sent to the decoder. In other words, objects can be selectively decoded.

In FIG. 18, the stream "id", both indexes and packet IDs of parent and child are transmitted in the form of table; however, this is only for an explanatory purpose and the transmission is not limited to this method only. Necessary items to be transmitted must tell at least the hierarchical relation. Some of the above items, e.g., indexes of parent and child, or packet IDs of parent and child can be thus omitted depending on transmission capacity as well as necessity.

The transmission mode of the hierarchical table is to be multiplexed onto the packet; however, there are various method as follows. The transmission mode is transmitted as a part of header of digital data, or, the hierarchical table is treated as independent digital data and transmitted either as another packet or by another transmission means.

In this fifth exemplary embodiment, indexes are added to digital data when the digital data are multiplexed. These indexes can be omitted when another method that can identify a border between packets or a kind of packet can be employed. For example, a quantity of data is transmitted as another data, or markers are inserted between different data, etc.

Further, in the above embodiments including previous ones, a display time and a reproduction time are added to digital data for synchronization and reproduction. When the synchronization and reproduction are not needed, or when each packet is synchronized, they are not added.

In these embodiments, video and audio are multiplexed; however, this is not the only combination to be multiplexed, but any digital data such as video and video, or video and other data, can be multiplexed.

INDUSTRIAL APPLICABILITY

A hierarchical structure of objects is maintained, while each object is assigned a packet No. and multiplexed, whereby respective objects can be easily replaced and edited without substantial increase of data quantity. This invention is realized by the method of multiplexing data, the method of data reproducing, and the multiplexed data reproducing apparatus using the method, and the medium that records the methods.

When packets are multiplexed, each object is assigned different priority order, thereby reducing a frequency of missing an important object. Further, when the object is reproduced, a relation between objects are taught, whereby an interpolation within the object can be operated. When picture data are synchronized with audio data, each object having its own time information is multiplexed, whereby an individual object can be synchronized. Also, the reproducing apparatus reproduces objects by matching times among objects, whereby a picture comprising multiple objects can be synchronized and reproduced.

What is claimed is:

1. A method of multiplexing digital data to a bitstream, the digital data including at least one of audio data and picture data, said method comprising the steps of:
   (a) multiplexing first digital data "p1" and second digital data "d1" to produce a first object data "o1";
   (b) making a third digital data "p2" as a second object data "o2"; and
   (c) further multiplexing the first object data "o1" and the second object data "o2" to produce a third object data "o3".

2. The method of multiplexing data as defined in claim 1, wherein one of the object data "o1" and the object data "o2" includes picture data that comprises a physical object.

3. The method of multiplexing data as defined in claim 1, wherein the third digital data "p2" is picture data that is a background of the object data "o1" displayed on the background.

4. The method of multiplexing data as defined in claim 1, wherein information of overlaying relation between the object data "o1" and the object data "o2" is also multiplexed when the object data "o3" is produced.

5. A method of multiplexing digital data to a bitstream, the digital data including at least one of audio data and picture data, said method comprising the steps of:
   (a) multiplexing first digital data "p1" and second digital data "d1" to produce a first object data "o1";
   (b) multiplexing third digital data "p2" and fourth digital data "d2" to produce a second object data "o2"; and
   (c) further multiplexing the first object data "o1" and the second object data "o2" to form a third object data "o3".

6. A method of multiplexing data, wherein a plurality of picture elements made of digital data undergo at least one of overlaying and mixing to complete a picture, and the digital data of each picture element is multiplexed, said method comprising the steps of:
   (a) multiplexing digital data "p1" and digital data "d1" to produce a first object data "o1";
   (b) packetizing the object data "o1" into a packet to produce a first packet data "op1";
   (c) packetizing digital data "p2" into a packet to produce a second packet data "op2"; and
   (d) further multiplexing the first packet data "op1" and the second packet data "op2" to produce a third packet data "op3",
       wherein a packet number identifying the packet is assigned to the first packet data "op1" and the second packet data "op2" respectively.

7. A method of multiplexing data, wherein a plurality of picture elements made of digital data undergo at least one of overlaying and mixing to complete a picture, and the digital data of each picture element is multiplexed, said method comprising the steps of:
   (a) multiplexing digital data "p1" and digital data "d1" to produce a first object data "o1";
   (b) packetizing the object data "o1" into a packet to produce a first packet data "op1";
   (c) multiplexing digital data "p2" and digital data "d2" to produce a second object data "o2";
   (d) packetizing the second object data "o2" into a packet to produce a second packet data "op2"; and
   (e) further multiplexing the first packet data "op1" and the second packet data "op2" to produce a third packet data "op3",
       wherein a packet number identifying the packet is assigned to the first packet data "op1" and the second packet data "op2" respectively.

8. A method of multiplexing data, wherein a plurality of picture elements made of digital data undergo at least one of overlaying and mixing to complete a picture, and the digital data of each picture element is multiplexed, said method comprising the steps of:
   (a) multiplexing digital data "p1" and digital data "d1" to produce a first object data "o1";
   (b) packetizing the object data "o1" into a packet to produce a first packet data "op1";
   (c) multiplexing digital data "p2" and digital data "d2" to produce a second object data "o2";
   (d) packetizing the second object data "o2" into a packet to produce a second packet data "op2"; and
   (e) further multiplexing the first packet data "op1" and the second packet data "op2" to produce a third packet data "op3",
       wherein a first packet number is assigned to the third packet data "op3", and different packet numbers, i.e., a second and a third packet numbers different from the first packet number are assigned to the packet data "op1" and "op2".

9. A method of multiplexing data, wherein a plurality of picture elements made of digital data undergo at least one of overlaying and mixing to complete a picture, and the digital data of each picture element is multiplexed, said method comprising the steps of:
   (a) multiplexing digital data "p1" and digital data "d1" to produce a first object data "o1";
   (b) packetizing the first object data "op1" into a packet to produce a first packet data "op1";
   (c) multiplexing a first table packet that indicates details and a packet number of the first packet data "op1" onto the first packet data "op1";
   (d) multiplexing digital data "p2" and digital data "d2" to produce a second object data "o2";
   (e) packetizing the second object data "o2" into a packet to produce a second packet data "op2";
   (f) multiplexing a second table packet that indicates details and a packet number of the second packet data "op2" onto the second packet data "op2"; and
   (g) further multiplexing the first packet data "op1" and the second packet data "op2" to produce a third packet data "op3";
       wherein the third packet data "op3" is further multiplexed with a third table packet that indicates details and a packet number of the third packet data "op3", and packet numbers of the first and second table packets are described in the third table packet.

10. A method of multiplexing data, wherein a plurality of picture elements made of digital data undergo at least one of overlaying and mixing to complete a picture, and the digital data of each picture element is multiplexed, said method comprising the steps of:
    (a) multiplexing digital data "p1" and digital data "d1" to produce a first object data "o1";
    (b) identifying digital data "p2" as a second object data "o2"; and
    (c) further multiplexing the first object data "o1" and the second object data "o2" to form a third object data "o3";
        wherein the first object data "o1" is multiplexed data including first time information necessary for synchronized reproduction of the digital data "p1" and the digital data "d1", and wherein the third object data "d3" to be multiplexed includes second time information necessary for synchronized reproduction of the third object data "d3".

11. A method of multiplexing data, wherein a plurality of picture elements made of digital data undergo at least one of overlaying and mixing to complete a picture, and the digital data of each picture element is multiplexed, said method comprising the steps of:

(a) multiplexing digital data "p1" and digital data "d1" to produce a first object data "o1";

(b) packetizing the object data "o1" into a packet to produce a first packet data "op1";

(c) identifying a digital data "p2" as a second object data "o2";

(d) packetizing the second object data "o2" into a packet to produce a second packet data "op2";

(e) further multiplexing the first packet data "op1" and the second packet data "op2" to produce a third packet data "op3"; and (f) assigning different priority orders to the first, second and third packet data "op1", "op2" and "op3" respectively.

12. A method of multiplexing data, wherein a plurality of picture elements made of digital data undergo at least one of overlaying and mixing to complete a picture, and the digital data of each picture element is multiplexed, said method comprising the steps of:

(a) multiplexing first digital data "p1" and second digital data "d1" to produce a first object data "o1";

(b) making a third digital data "p2" as a second object data "o2"; and (c) further multiplexing the first object data "o1" and the second object data "o2" to produce a third object data "o3" and wherein the third object data "o3" is multiplexed by scenario data having both reproduction time and reproduction location of one of the object data "o1", "o2" and "o3".

13. The method of multiplexing data of claim 12, wherein the multiplexed data is reproduced based on the scenario data describing the reproduction time and location.

14. A method of multiplexing data, wherein a picture is treated as an aggregate of a plurality of objects, and the picture data are processed on an object-oriented basis, then the processed data is multiplexed, and wherein a plurality of picture elements made of digital data undergo at least one of overlaying and mixing to complete a picture, and the digital data of each picture element is multiplexed, said method comprising the steps of:

(a) dividing the picture into a plurality of master objects, and identifying themselves as the master objects;

(b) dividing the identified master object into smaller slave objects when necessary, and identifying themselves as the slave objects, whereby a hierarchy is formed;

(c) packetizing one of the identified master object, the identified master and slave objects, and the identified slave object into a packet, then assigning a packet number to the packet, and (d) adding the hierarchical details as hierarchical information to the multiplexed data.

15. The method of multiplexing data as defined in claim 14, wherein said object is identified independently by designating at least one of a picture background, a moving body and elements of the moving body.

16. The method of multiplexing data as defined in claim 14, wherein said object is identified by designating a target object.

17. The method of multiplexing data as defined in claim 14, wherein said object is identified independently by designating at least one of picture data, audio data and additional information.

18. The method of multiplexing data as defined in claim 14, wherein said hierarchy comprising:

an upper class comprising a parent body in the object; and a lower class comprising a child body that is an element of the parent body.

19. A reproducing method of data multiplexed through the method described in claim 14, said reproducing method comprising the steps of:

(a) separating the multiplexed data into hierarchical classes based on hierarchical information when the hierarchical information is attached to the multiplexed data;

(b) picking out a packet number of a slave object, which is multiplexed on the multiplexed data, respectively from the class;

(c) picking out a packet number of a master object, which is multiplexed on the multiplexed data, respectively from the class; and (d) reproducing the multiplexed data based on the packet numbers picked out through the above processes as defined in (b) and (c).

20. A multiplexed data reproducing apparatus that reproduces the data multiplexed through the method described in claim 14, said reproducing apparatus comprising:

(a) hierarchy separating means for separating the multiplexed data into hierarchical classes based on hierarchical information when the multiplexed data is attached with the hierarchical information;

(b) first picking out means for picking out a packet number of a slave object, which is multiplexed on the multiplexed data, respectively from the class;

(c) second picking out means for picking out a packet number of a master object, which is multiplexed on the multiplexed data, respectively from the class; and (d) data reproducing means for reproducing the multiplexed data based on the packet numbers picked out through the above means as defined in (b) and (c).

21. A reproducing method of data multiplexed through the method as described in claim 1, wherein time data telling when a reproduction starts and location data telling where the reproduction is located are in the multiplexed data, and the multiplexed data is reproduced based on said time data and location data.

22. A reproducing method of data multiplexed through a method of multiplexing data, wherein a plurality of picture elements made of digital data undergo at least one of overlaying and mixing to complete a picture, and the digital data of each picture element is multiplexed, said multiplexing method comprising the steps of:

(a) multiplexing first digital data "p1" and second digital data "d1" to produce a first object data "o1";

(b) making a third digital data "p2" as a second object data "o2"; and (c) further multiplexing the first object data "o1" and the second object data "o2" to produce a third object data "o3", wherein the multiplexed data is reproduced based on one of time information among a plurality of time information having different time bases.

23. A reproducing method of data multiplexed through the method as described in claim 4, wherein information related to relationships between objects is picked out from object data "o3", and one of object data "o1", "o2" and "o3" is selected before being reproduced.

24. A data reproducing apparatus that reproduces data multiplexed according to a data multiplexing method wherein a plurality of picture elements made of digital data undergo at least one of overlaying and mixing to complete a picture, and the digital data of each picture element is multiplexed, said multiplexing method comprising the steps of:

(a) multiplexing first digital data "p1" and second digital data "d1" to produce a first object data "o1";

(b) making a third digital data "p2" as a second object data "o2"; and (c) further multiplexing the first object data "o1" and the second object data "o2" to produce a third object data "o3", wherein one of a picture, audio and data predetermined by the reproducing apparatus replaces a corresponding picture, audio and data when one of these is unable to be reproduced.

25. A data reproducing apparatus that decodes data multiplexed as described in claim 1, wherein one of a picture object, an audio object and a data object each of which is owned by a decoder interpolates, completes and replaces one of a picture object, an audio object, and a data object when one of these objects are unable to be reproduced, and for reproduction.

26. A recording medium on which multiplexed data are recorded, the data being multiplexed according to a method of multiplexing digital data to a bitstream, the digital data including at least one of audio and picture data, said method comprising the steps of:

(a) multiplexing first digital data "p1" and second digital data "d1" to produce a first object data "o1";

(b) making a third digital data "p2" as a second object data "o2"; and (c) further multiplexing the first object data "o1" and the second object data "o2" to produce a third object data "o3".

27. The method of multiplexing data as described in claim 1, and further comprising the step of multiplexing audio data.

* * * * *